United States Patent [19]

Stedman

[11] 3,779,905
[45] Dec. 18, 1973

[54] ADDING CORROSION INHIBITOR TO TOP OF CRUDE OIL STILL

[75] Inventor: Russell F. Stedman, Des Plaines, Ill.

[73] Assignee: Universal Oil Products Company, Des Plaines, Ill.

[22] Filed: Sept. 20, 1971

[21] Appl. No.: 182,182

[52] U.S. Cl. .................. 208/348, 203/7, 208/47
[51] Int. Cl. ............................................. C10g 7/00
[58] Field of Search .................... 208/47, 348, 363, 208/356; 203/7

[56] References Cited
UNITED STATES PATENTS

| | | | |
|---|---|---|---|
| 3,017,360 | 1/1962 | Cyba | 208/48 AA |
| 3,189,537 | 6/1965 | Carlton | 208/47 |
| 3,447,891 | 6/1969 | Crawford | 208/47 |
| 2,938,851 | 5/1960 | Stedman et al. | 208/47 |

Primary Examiner—Herbert Levine
Attorney—James R. Hoatson et al.

[57] ABSTRACT

Avoiding corrosion by HCl of overhead condensing equipment from a crude column by injecting an amine containing at least 7 carbon atoms into the reflux being returned to the upper portion of the crude column. An amine hydrochloride is formed which is non-volatile and hydrocarbon soluble. Accordingly, it will be withdrawn from a lower section of the column and will not pass overhead into the communicating condensing equipment.

6 Claims, No Drawings

ADDING CORROSION INHIBITOR TO TOP OF CRUDE OIL STILL

BACKGROUND OF THE INVENTION

When crude oil is distilled, hydrolyzable salts, such as calcium chloride, magnesium chloride, etc., yield hydrochloric acid under high temperature steam stripping. The hydrogen chloride vapor is carried overhead and may cause extensive damage to the communicating heat exchangers. Numerous methods have been proposed heretofore to avoid corrosion of the fractionator, heat exchangers, condensers and receivers through which the hydrogen chloride pass. In one method, ammonia is added to the overhead vapor stream, thus partially neutralizing the hydrogen chloride. However, the ammonium chloride is a semi-volatile acid salt and causes corrosion to the heat exchanger tubes during cooling and condensation of the overhead stream.

DESCRIPTION OF THE INVENTION

In accordance with the present invention, an amine compound containing at least 7 carbon atoms is injected into the reflux being returned to the upper portion of the crude column. The amine compound reacts with the hydrogen chloride to form an amine hydrochloride which is non-volatile and hydrocarbon soluble. The resultant hydrochloride salt will descend in the fractionator and be withdrawn largely in the kerosine fraction being removed as a side cut from the crude column or from a lower point in the column.

In one embodiment the present invention relates to an improved method of reducing corrosion of the overhead condensing system communicating with a vertical fractionator utilized for the fractionation of crude petroleum oil containing chloride, which comprises injecting an amine compound containing at least 7 carbon atoms into the upper portion of the fractionator, whereby a hydrocarbon soluble non-volatile amine hydrochloride salt is formed, withdrawing a light vaporous fraction reduced in chloride from the upper portion of said fractionator, and separately withdrawing from a lower portion of said fractionator a heavier fraction containing amine hydrochloride salt.

From the above embodiment, it will be seen that a particular type of amine is injected into the reflux stream being returned to the crude column in order to form a non-volatile hydrocarbon soluble amine hydrochloride salt. The amine contains at least 7 carbon atoms and may be of varied composition and configuration, with the only requirement being that it forms a stable hydrochloride salt which is non-volatile and hydrocarbon soluble. There is no upper limit on the number of carbon atoms which the amine contains, provided it meets the requirements hereinbefore set forth. In general, the amine may contain from 7 to about 100 and preferably from 7 to about 60 carbon atoms.

In one embodiment the amine compound is a primary amine, and may be selected from heptyl amine, octyl amine, nonyl amine, decyl amine, undecyl amine, dodecyl amine, tridecyl amine, tetradecyl amine, pentadecyl amine, hexadecyl amine, heptadecyl amine, octadecyl amine, nonadecyl amine, eicosyl amine, heneicosyl amine, docosyl amine, tricosyl amine, tetracosyl amine, pentacosyl amine, hexacosyl amine, heptacosyl amine, octacosyl amine, nonacosyl amine, triacontyl amine, etc., which may be straight or branched chain. In another embodiment the amine is a secondary amine and may be selected from dibutyl amine, dipentyl amine, dihexyl amine, diheptyl amine, dioctyl amine, dinonyl amine, didecyl amine, diundecyl amine, didodecyl amine, ditridecyl amine, ditetradecyl amine, dipentadecyl amine, dihexadecyl amine, diheptadecyl amine, dioctadecyl amine, dinonadecyl amine, dieicosyl amine, diheneicosyl amine, didocosyl amine, ditricosyl amine, ditetracosyl amine, dipentacosyl amine, dihexacosyl amine, diheptacosyl amine, dioctacosyl amine, dinonacosyl amine, ditriacontyl amine, etc., as well as mixed secondary amines in which the alkyl groups are of different chain length but comprise a total of at least 7 carbon atoms. Illustrative amines in this embodiment may comprise methylhexyl amine, ethylhexyl amine, propylhexyl amine, butylhexyl amine, amylhexyl amine, heptylhexyl amine, octylhexyl amine, nonylhexyl amine, decylhexyl amine, undecylhexyl amine, dodecylhexyl amine, tridecylhexyl amine, tetradecylhexyl amine, pentadecylhexyl amine, hexadecylhexyl amine, heptadecylhexyl amine, octadecylhexyl amine, nonadecylhexyl amine, eicosylhexyl amine, heneicosylhexyl amine, docosylhexyl amine, tricosylhexyl amine, tetracosylhexyl amine, pentacosylhexyl amine, hexacosylhexyl amine, heptacosylhexyl amine, octacosylhexyl amine, nonacosylhexyl amine, triacontylhexyl amine, etc., methylheptyl amine, ethylheptyl amine, propylheptyl amine, butylheptyl amine, pentylheptyl amine, hexylheptyl amine, octylheptyl amine, nonylheptyl amine, decylheptyl amine, undecylheptyl amine, dodecylheptyl amine, tridecylheptyl amine, tetradecylheptyl amine, pentadecylheptyl amine, hexadecylheptyl amine, heptadecylheptyl amine, octadecylheptyl amine, nonadecylheptyl amine, eicosylheptyl amine, heneicosylheptyl amine, docosylheptyl amine, tricosylheptyl amine, tetracosylheptyl amine, pentacosylheptyl amine, hexacosylheptyl amine, heptacosylheptyl amine, octacosylheptyl amine, nonacosylheptyl amine, triacontylheptyl amine and corresponding secondary amines in which one alkyl group contains from 8 to 40 or more carbon atoms and the other alkyl group contains from 1 to 40 or more carbon atoms.

In still another embodiment the amine is a tertiary amine containing at least 7 carbon atoms. Illustrative amines in this embodiment include tripropyl amine, tributyl amine, tripentyl amine, trihexyl amine, triheptyl amine, trioctyl amine, trinonyl amine, tridecyl amine, triundecyl amine, tridodecyl amine, tri-tridecyl amine, tritetradecyl amine, tripentadecyl amine, trihexadecyl amine, triheptadecyl amine, trioctadecyl amine, trinonadecyl amine, trieicosyl amine, triheneicosyl amine, tridocosyl amine, tri-tricosyl amine, tritetracosyl amine, tripentacosyl amine, trihexacosyl amine, triheptacosyl amine, trioctacosyl amine, trinonacosyl amine, tri-triacontyl amine, etc., and mixed tertiary amines in which the alkyl groups are different and contain from 1 to 40 carbon atoms each but the total number of carbon atoms is at least 7.

In still another embodiment the amine compound is a polyamine containing from 7 to about 100 carbon atoms per molecule. The polyamine compound may comprise alkylene diamine, dialkylene triamine, trialkylene tetramine, tetralkylene pentaamine in which one or more of the nitrogen atoms is substituted with alkyl groups of from 1 to 50 carbon atoms each and the alkylene moiety contains from 2 to about 12 carbon atoms each. Particularly preferred in this embodiment are the N-alkyl-1,3-diaminopropanes in which the alkyl moiety is derived from fatty acids including, for example, tallow, coco, soya, etc. A number of these N-alkyl-diaminopropanes are available commercially as will be hereinafter set forth, and advantageously are used in the present invention.

It is understood that the different amine compounds are not necessarily equivalent and that the particular amine will be selected with reference to its activity price and availability in forming a stable non-volatile hydrocarbon soluble hydrochloride salt under the conditions prevailing in the upper portion of the crude column. While the aliphatic amines are preferred, it is understood that cyclic amines also may be used, with the provision that a hydrochloride salt is formed which meets the requirements as hereinbefore set forth.

In still another embodiment, the amine compound may comprise an alkanol amine containing at least 7 carbon atoms and up to about 100 and preferably up to about 70 carbon atoms. The number of hydroxyl groups contained in the alkanol amine will be insufficient to destroy the hydrocarbon solubility of the resultant hydrochloride salt. In general, the lower the number of carbon atoms, the lower the number of hydroxyl groups and, vice versa, the higher the number of carbon atoms, the higher the number of hydroxyl groups it may tolerate. Illustrated alkanol amines in this embodiment include heptanol amine, octanol amine, nonanol amine, decanol amine, undecanol amine, dodecanol amine, tridecanol amine, tetradecanol amine, pentadecanol amine, hexadecanol amine, heptadecanol amine, octadecanol amine, nonadecanol amine, eicosanol amine, heneicosanol amine, docosanol amine, tricosanol amine, tetracosanol amine, pentacosanol amine, hexacosanol amine, heptacosanol amine, octacosanol amine, nonacosanol amine, triancontanol amine, etc. Here again, the amine may be a primary, secondary or tertiary amine and the carbon atoms may be in straight or branched chain arrangement.

In another embodiment the alkanol amine is a polymeric reaction product of an amine with an epihalohydrin compound. In one embodiment the amine is an aliphatic monoamine containing from about 4 to about 40 and preferably from about 12 to about 30 carbon atoms. The amines may be selected from those hereinbefore set forth. Conveniently, the long chain amines are prepared from fatty acids or more particularly mixtures of fatty acids formed as products or by-products. Such mixtures are available commercially, generally at lower prices and, as another advantage to the present invention, the mixtures may be used without the necessity of separating individual amines in pure state. An example of such a mixture is hydrogenated tallow amine which is available under various tradenames including "Alamine H26D" and "Armeen HTD." These products comprise mixtures predominating in alkyl amines containing 16 to 18 carbon atoms per alkyl group, although they contain a small amount of alkyl groups have 14 carbon atoms.

In another embodiment the amine for reacting with the epihalohydrin compound is a polyamine. Particularly preferred are the N-alkyl-polyamines and especially the N-alkyl-diaminopropanes in which said alkyl contains from 4 to about 50 carbon atoms. Illustrative compounds in this embodiment include N-butyl-1,3-diaminopropane, N-pentyl-1,3-diaminopropane, N-hexyl-1,3-diaminopropane, N-heptyl-1,3-diaminopropane, N-octyl-1,3-diaminopropane, N-nonyl-1,3-diaminopropane, N-decyl-1,3-diaminopropane, N-undecyl-1,3-diaminopropane, N-dodecyl-1,3-diaminopropane, N-tridecyl-1,3-diaminopropane, N-tetradecyl-1,3-diaminopropane, N-pentadecyl-1,3-diaminopropane, N-hexadecyl-1,3-diaminopropane, N-heptadecyl-1,3-diaminopropane, N-octadecyl-1,3-diaminopropane, N-nonadecyl-1,3-diaminopropane, N-eicosyl-1,3-diaminopropane, N-heneicosyl-1,3-diaminopropane, N-docosyl-1,3-diaminopropane, N-tricosyl-1,3-diaminopropane, N-tetracosyl-1,3-diaminopropane, N-pentacosyl-1,3-diaminopropane, N-hexacosyl-1,3-diaminopropane, N-heptacosyl-1,3-diaminopropane, N-octacosyl-1,3-diaminopropane, N-nonacosyl-1,3-diaminopropane, N-triacontyl-1,3-diaminopropane, etc. As before, mixtures are available commercially, usually at lower prices, of suitable compounds in this class and advantageously are used for the purposes of this invention. One such mixture is "Duomeen T" which is N-tallow-1,3-diaminopropane and predominates in alkyl groups containing from 16 to 18 carbon atoms each, although the mixture contains a small amount of alkyl groups containing 14 carbon atoms each. Another mixture available commercially is N-coco-1,3-diaminopropane which contains alkyl groups predominating in 12 to 14 carbon atoms each. Still another example is N-soya-1,3-diaminopropane which predominates in alkyl groups containing 18 carbon atoms per group, although it contains a small amount of alkyl groups having 16 carbon atoms.

While the N-alkyl-1,3-diaminopropanes are preferred compounds in this class, it is understood that suitable N-alkyl ethylenediamines, N-alkyl-1,3-diaminobutanes, N-alkyl-1,4-diaminobutanes, N-alkyl-1,3-diaminopentanes, N-alkyl-1,4-diaminopentanes N-alkyl-1,5-diaminopentanes, N-alkyl-1,3-diaminohexanes, N-alkyl-1,4-diaminohexanes, N-alkyl-1,5-diaminohexanes, N-alkyl-1,6-diaminohexanes, etc., may be employed, but not necessarily with equivalent results. Also, it is understood that polyamines containing three or more nitrogen atoms may be employed provided they meet the requirements hereinbefore set forth. Illustrative examples of such compounds includes N-dodecyl-diethylene triamine, N-tridecyldiethylene triamine, N-tetradecyl-diethylene triamine, etc., N-dodecyl-dipropylene triamine, N-tridecyl-dipropylene triamine, N-tetradecyl-dipropylene triamine, etc., N-dodecyl-dibutylene triamine, N-tridecyl-dibutylene triamine, N-tetradecyl-dibutylene triamine, etc., N-dodecyl-triethylene tetramine, N-tridecyltriethylene tetramine, N-tetradecyl triethylene tetramine, etc., N-dodecyl-tripropylene tetramine, N-tridecyl-tripropylene tetramine, N-tetradecyl-tripropylene tetramine, etc., N-dodecyl-tributylene tetramine, N-tridecyl-tributylene tetramine, N-tetradecyl-tributylene tetramine, etc., N-dodecyl-tetraethylene pentamine, N-tridecyl-tetraethylene pentamine, N-tetradecyl-tetraethylene pentamine, etc., N-dodecyl-tetrapropylene pentamine, N-tridecyltetrapropylene pentamine, N-tetradecyl-tetrapropylene pentamine, etc., N-dodecyl-tetrabutylene pentamine, N-tridecyl-tetrabutylene pentamine, N-tetradecyl-tetrabutylene pentamine, etc.

As hereinbefore set forth, the amine compound is reacted with an epihalohydrin compound. Epichlorohydrin is preferred. Other epichlorohydrin compounds include 1,2-epoxy-4-chlorobutane, 2,3-epoxy-4-chlorobutane, 1,2-epoxy-5-chloropentane, 2,3-epoxy-5-chloropentane, etc. In general, the chloro derivatives are preferred, although it is understood that the corresponding bromo and iodo compounds may be employed. In some cases epidihalohydrin compounds may be utilized. It is understood that the different epihalohydrin compounds are not necessarily equivalent and that, as hereinbefore set forth, epichlorohydrin is preferred.

The amine is reacted with the epihalohydrin compound in a mole ratio of from about 1 to about 2 mole proportions of amine to from about 1 to about 1.5 mole proportions of epihalohydrin compound. The amine and epichlorohydrin preferably are reacted in substantially equal mole proportions.

The reaction of amine and epihalohydrin is effected in any suitable manner. In one method, the desired quantity of amine and epihalohydrin compound may be charged to a reaction zone and therein reacted, although generally it is preferred to supply one reactant to the reaction zone and then introduce the other reactant step wise. Thus, the epihalohydrin compound may be charged to the reaction zone and the amine is added step wise, with stirring. Preferably, the reaction of epichlorohydrin with the second or later portions of the amine is effected at a higher temperature than with the first portion of the amine. The reaction preferably is effected in the presence of a suitable solvent and particularly a hydroxylic solvent. In a preferred method, a solution of the amine in a solvent and a separate solution of the epihalohydrin compound in a solvent are prepared and these solutions then are commingled in the manner hereinbefore set forth, at least one of the solvents being hydroxylic. Any suitable solvent may be employed and preferably comprises an alcohol including ethanol, propanol, butanol, etc., with 2-propanol being particularly desirable. Other hydroxylic solvents comprise glycols including ethylene glycol, propylene glycol, etc., glycerol or other polyhydric solvents.

The reaction of amine compound and epihalohydrin compound is effected at any suitable temperature, which generally will be within the range of from about 60° to about 300° F. and preferably is in the range of from about 120° to about 185° F. Conveniently, the reaction is effected by heating an epichlorohydrin solution in dilute alcohol at refluxing conditions, with stirring, gradually adding the amine thereto, and continuing the heating, preferably at a higher temperature, until the reaction is completed, or the reverse order of adding the reactants may be employed.

After the initial reaction of the amine compound and epihalohydrin compound is completed, the organic halide salt, which inherently is formed, is converted to an inorganic salt, to thereby liberate the free amine for further reaction to form the desired polymeric product. This may be effected in any suitable manner and generally is accomplished by reacting the primary reaction product with a strong inorganic base such as sodium hydroxide, potassium hydroxide, etc., to form the corresponding metal halide. The reaction to form the metal halide is effected at a temperature within the range of from about 130° to about 212° F. and preferably from about 165° to about 195° F.

In one embodiment the product at this stage of manufacture may be withdrawn from the reaction zone and filtered or otherwise treated to remove the inorganic halide. Generally, however, it is preferred to perform the next step in the same reaction zone without removing the inorganic halide. At the conditions used in forming the polymeric reaction product, the inorganic halide is inert and, therefore, its presence is not objectionable. Regardless of whether or not the inorganic halide is removed, the primary reaction product of the amine compound and epihalohydrin compound is now further heated and reacted in order to form the desired linear polymeric reaction product. This further heating and reacting is at a temperature of from about 130° to about 212° F. and preferably from about 165° to about 195° F.

After formation of the desired polymeric reaction product or before this step as mentioned above, the inorganic halide salt is removed in any suitable manner, including filtering, centrifugal separation, etc. In some cases, it may be of advantage to effect the filtration at an elevated temperature, which may range from about 95° to about 160° F. or more.

As hereinbefore set forth, the polymeric reaction product will have from 2 to 20 and preferably from 3 to 10 recurring units. The reaction products will range from liquids to solids and, when desired, may be prepared as a solution in a suitable solvent for ease in handling and using. A preferred solvent is an aromatic hydrocarbon including benzene, toluene, xylene, ethylbenzene, diethylbenzene, cumene, etc., or a mixed solvent such as naphtha, kerosine, xylene tower bottoms, etc. In one embodiment all or a portion of the aromatic solvent desired in the final product may be used as a solvent during the reaction, in addition to the hydroxylic solvent and the aromatic solvent is allowed to remain in the final product.

The above are illustrative examples of amine compounds which may be used in accordance with the present invention, with the understanding that the different compounds are not necessarily equivalent but will be selected on the basis of forming a stable, non-volatile hydrocarbon soluble amine hydrochloride salt.

The novel feature of the present invention may be used with conventional crude columns which normally contain a series of trays, baffle plates, down-comers, valve plates or other suitable contact devices. The crude column generally is operated with a bottom temperature in the range of from about 500° to about 825° F. and a top temperature of from about 250° F. to about 420° F., although lower or higher temperatures may be employed in some cases. Generally the desired temperature is obtained by first passing the crude oil in indirect heat exchange with one or more of the overhead naphtha vapors, side cuts, and the residual fraction being withdrawn from the lower portion of the crude column and then by further heating in a suitable furnace. The crude column generally is operated at a pressure below about 50 pounds per square inch although, here again, a higher pressure may be employed when advantages appear therefor. The design and operation of crude columns are well known in the art and require no detailed description herein. In most cases, steam is introduced into crude columns and, here again, this is well known in the art and need not be described in detail herein.

The specific amount of amine compound to be injected into the upper portion of the crude column and conveniently into the reflux stream being returned to the upper portion of the column will be selected with reference to the hydrolyzable chloride content of the "salt" in the crude oil. The amount of amine compound may range from about 5 to about 100 or more and preferably from about 10 to about 40 parts per million based on the crude oil, although higher or lower concentrations may be used. Generally an excess of amine compound over the stoichiometric requirement is used in order to insure complete reaction with the chloride. The specific concentration will be determined by the concentration of the chloride in the overhead receiver water and/or on the pH of the receiver water.

As hereinbefore set forth the amine compound is injected into the upper portion of the crude column. The introduction to the amine compound is conveniently accomplished by injecting the amine compound into the reflux being returned to the upper portion of the column. However, it is understood that the amine compound may be introduced into the crude column in any other suitable manner when advantages appear therefor. Regardless, a non-volatile hydrocarbon soluble amine hydrochloride salt is formed and is removed from the lower proportion of the crude column, whereby the light vaporous fraction being withdrawn overhead from the crude column will be reduced in chloride and thereby reduce corrosion of the communicating heat exchangers, condensers and receivers.

The following examples are introduced to illustrate further the novelty and utility of the present invention but not with the intention of unduly limiting the same.

EXAMPLE I

In a crude unit charging 50,000 barrels per day of crude oil, the crude oil is desalted in conventional manner to leave about 2 pounds of salt per 1,000 barrels of crude oil. The desalted crude oil is partially heated by indirect heat exchange with the side cuts and residual fraction being withdrawn from crude column and then is further heated in a furnace to provide a temperature of 750° F. or higher in the lower section of the crude column. The crude column is of conventional design and contains a series of bubble trays, with steam being introduced into the lower portion of the crude column. The top temperature of the crude column is controlled by condensate being returned as reflux thereto, in order that the light fraction being withdrawn overhead will have an end boiling point of about 400° F. A kerosine side stream is withdrawn from a mid-portion of the crude column and will have an end point of about 525° F. A diesel oil side stream is withdrawn from a lower portion in the fractionator and will have an end point of about 650° F. Other side cuts as desired are withdrawn from the column. Higher boiling oil is withdrawn as a residual fraction from the bottom of the crude column.

In the particular operation described in this example, 25% by weight of the crude oil is withdrawn overhead as the light vaporous fraction and referred to in the art as naphtha. It is this fraction which otherwise would contain corrosive chloride components and in prior art methods would cause corrosion of the communicating heat exchangers, condensers and receivers. However, in accordance with the present invention, approximately 1.5 pounds of amine compound is injected per 1,000 barrels of reflux. The reflux in this operation amounts to about 12,000 barrels per day of condensate being returned to the upper portion of the crude column. The amine compound being injected into the reflux stream is n-octylamine. As hereinbefore set forth, non-volatile hydrocarbon soluble amine hydrochloride salt is formed, which descends down the crude column and is withdrawn in the kerosine fraction being removed as a side cut.

EXAMPLE II

In place of octaylamine, the amine compound injected into the reflux stream is the polymeric condensation product of one mole proportion of epichlorohydrin and one mole proportion of hydrogenated tallow amine. The polymeric reaction product is prepared in the manner described hereinbefore by first forming a solution of two moles of epichlorhydrin in a mixture of xylene and 2-propanol. A separate solution of two moles of the hydrogenated tallow amine is prepared in an equal volume of xylene. One mole of the latter solution is gradually added to the epichlorohydrin solution, with stirring and heating at 130°–140° F. for about 2.5 hours, after which another mole of the hydrogenated tallow amine is added gradually with stirring and heating at 175° F. for about 2.5 hours. One mole of sodium hydroxide then is added with stirring and heating at 185°–195° F. for 3.5 hours, after which another mole of sodium hydroxide is added, with stirring and heating at 185°–195° F. for one hour. This results in the formation of the desired polymeric reaction product, which is distilled to remove the alcohol solvent but allowing the xylene solvent to remain. Additional xylene is added to form a 50 percent by weight solution. The solution is injected into the reflux stream being returned to the crude column in a concentration of 40 parts per million of active ingredient, based on the crude oil charge.

I claim as my invention:

1. In the fractionation of crude petroleum oil containing chloride, the improved method of reducing HCl corrosion of the overhead condensing system communicating with a vertical fractionator, which comprises neutralizing said HCl by injecting into the upper portion of said fractionator a neutralizing agent consisting essentially of a polymeric reaction product of an epihalohydrin compound and an amine containing from 7 to about 100 carbon atoms which is capable of forming a non-volatile hydrocarbon soluble hydrochloride salt; forming the hydrocarbon soluble non-volatile amine hydrochloride salt of said polymeric reaction product; withdrawing a light vaporous fraction reduced in chloride from the upper portion of said fractionator at a point above the point of injection of said amine compound, and separately withdrawing from a lower portion of said fractionator a heavier fraction containing said amine hydrochloride salt.

2. The method of claim 1 in which said amine compound is injected into the reflux stream being returned to the upper portion of said fractionator.

3. The method of claim 1 in which steam is introduced into a lower portion of said fractionator.

4. The method of claim 1 in which said polymeric reaction product is formed at a temperature of from about 60° F. to about 300° F. by the reaction of from 1 to about 2 mole proportions of an amine with from about 1 to about 1.5 mole proportions of epihalohydrin.

5. The method of claim 4 wherein said amine reacted with said epichlorohydrin is an aliphatic monoamine.

6. The method of claim 4 wherein said amine reacted with said epichlorohydrin is an N-alkyl-1,3-diaminopropane containing 4 to about 50 carbon atoms in said alkyl.

* * * * *